(12) United States Patent
Gerber et al.

(10) Patent No.: US 8,700,497 B2
(45) Date of Patent: Apr. 15, 2014

(54) INVENTORY MECHANISM THAT GENERATES LOGICAL INVENTORY FROM ASSEMBLIES IN INVENTORY

(75) Inventors: Timothy James Gerber, Rochester, MN (US); Ivory Wellman Knipfer, Rochester, MN (US); William Robert Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/677,093

(22) Filed: Feb. 21, 2007

(65) Prior Publication Data
US 2008/0201001 A1    Aug. 21, 2008

(51) Int. Cl.
G06Q 10/00    (2012.01)
A01K 5/02    (2006.01)
G06F 17/50    (2006.01)

(52) U.S. Cl.
USPC ............................................. 705/28; 705/29

(58) Field of Classification Search
USPC ...................................................... 705/28, 29
See application file for complete search history.

(56) References Cited

U.S. PATENT DOCUMENTS

| | | | | | |
|---|---|---|---|---|---|
| 4,509,123 | A | * | 4/1985 | Vereen | 700/130 |
| 4,591,983 | A | * | 5/1986 | Bennett et al. | 706/53 |
| 5,767,500 | A | * | 6/1998 | Cordes et al. | 235/462.47 |
| 6,031,715 | A | * | 2/2000 | Magette | 361/679.58 |
| 6,185,806 | B1 | * | 2/2001 | Malone et al. | 29/434 |
| 7,136,713 | B2 | * | 11/2006 | Mok et al. | 700/95 |
| 7,251,611 | B2 | * | 7/2007 | Abbott et al. | 705/7.12 |
| 7,343,212 | B1 | * | 3/2008 | Brearley et al. | 700/106 |
| 8,099,336 | B2 | * | 1/2012 | Klim et al. | 705/28 |
| 2005/0283412 | A1 | * | 12/2005 | Cheng et al. | 705/28 |
| 2005/0289022 | A1 | * | 12/2005 | Iida et al. | 705/29 |
| 2007/0288112 | A1 | * | 12/2007 | Knipfer et al. | 700/105 |
| 2008/0056228 | A1 | * | 3/2008 | Knipfer et al. | 370/349 |
| 2008/0065500 | A1 | * | 3/2008 | Foth et al. | 705/26 |
| 2008/0082427 | A1 | * | 4/2008 | Gandhi et al. | 705/28 |
| 2008/0201001 | A1 | * | 8/2008 | Gerber et al. | 700/97 |
| 2008/0301010 | A1 | * | 12/2008 | Klim et al. | 705/28 |

OTHER PUBLICATIONS

Material Requirements Planning, Stalinski Piotr, Allied academics Conf proceedings, 14:2 63-68, 2007.*
Supplying the home construction: Allen Shane, Watts Larry R: Allied academics conf Proceedings, 9.1: 15-20, 2002.*

* cited by examiner

Primary Examiner — Matthew Gart
Assistant Examiner — Harshad Parikh
(74) Attorney, Agent, or Firm — Martin & Associates, LLC

(57) ABSTRACT

A logical inventory mechanism takes components in assemblies into account when determining purchase requirements. The inventory control system determines assemblies that are available, determines their components and whether or not each component may be reused, then adjusts physical inventory to generate therefrom logical inventory based on physical inventory plus parts in the assemblies that may be reused if the assemblies are disassembled. By computing logical inventory that would be available by disassembling assemblies, inventory levels may be reduced, thereby enhancing the efficiency of an inventory control system that includes the logical inventory mechanism. Assemblies in inventory thus may be used in two very different matters, as the starting point for a higher-level assembly, or to be disassembled to use one or more reusable components in the assembly in a different assembly.

3 Claims, 8 Drawing Sheets

| Product Demand ||
|---|---|
| Stock Item | Quantity |
| SEO-1 | 500 |

| Stock Item Physical Inventory ||
|---|---|
| Stock Item | Quantity |
| SEO-1 | 1000 |
| PN A | 10 |
| PN B | 10 |
| PN C | 10 |
| PN D | 10 |
| PN E | 10 |
| PN F | 10 |
| PN G | 10 |
| PN H | 10 |

INVENTORY MECHANISM THAT GENERATES LOGICAL INVENTORY FROM ASSEMBLIES IN INVENTORY

BACKGROUND

1. Technical Field

This disclosure generally relates to inventory management systems, and more specifically relates to an inventory mechanism that adjusts inventory of components based on components available in assemblies in inventory.

2. Background Art

Inventory control systems have been developed as part of manufacturing processes. There are typically many different levels of hierarchy in an inventory control system. Individual parts may be assembled together to build a Build-to-Plan (BTP) item.

One example of a BTP item is a memory card, which may contain many parts such as a printed circuit board, integrated circuits, resistors, capacitors, etc. Once a BTP item is manufactured, it is put into inventory under the BTP part number. In similar fashion, Configure-to-Order (CTO) items may contain multiple BTP items. One example of a CTO item is a System i™ integrated business system manufactured by IBM Corporation. A CTO item typically includes many BTP items.

Some CTO items may have common characteristics that allow partially building a common assembly that may be used as a starting point for many different CTO items. For example, most System i platforms may include a common chassis, a common motherboard, a common processor, a common power supply, and a common memory card. To help expedite the manufacturing process, an assembly that includes these common BTP items could be defined so the assembly may be manufactured and tested in advance, then additional BTP items may be added as specified in a CTO order. Thus, the example assembly above with the five BTP items (chassis, motherboard, processor, power supply, memory card) could be used as a starting point for many different CTO orders, thereby streamlining the process of building CTO items. This assembly is given a part number, and future CTO items may then be built using the part number of the assembly as a starting point.

One problem that arises when assemblies are built and put into inventory is that inventory requirements may change. Thus, an inventory control system may decide today to build 50 assemblies based on current demand and inventory. A few days later, the inventory control system may receive an order for CTO items, but may now have insufficient stock of BTP items because many BTP items are now sitting in the assemblies. These assemblies typically have a high-level part number that effectively hides the contents of these assemblies from the inventory control system. In other words, once a BTP unit is placed in an assembly that has its own part number, the part number of the assembly becomes the item the inventory control system keeps track of. As a result, known inventory control systems do not provide an architected way to determine what inventory is available in an assembly should the assembly be disassembled. In other words, in the prior art, once a BTP is put in an assembly, the BTP is no longer available for use. Yet many of these BTPs could be easily removed from the assembly and could then be placed in a different assembly. Because there is no architected way to account for reusable components in an assembly in the prior art, there is no way for known inventory management systems to adjust physical inventory levels according to reusable components in assemblies. Without a way to more effectively manage assemblies and account for components in an assembly, the manufacturing industry will continue to suffer from less efficient ways of handling existing inventory in fulfilling new orders.

BRIEF SUMMARY

A logical inventory mechanism takes components in assemblies into account when determining purchase requirements. The inventory control system determines assemblies that are available, determines their components and whether or not each component may be reused, then adjusts physical inventory to generate therefrom logical inventory based on physical inventory plus parts in the assemblies that may be reused if the assemblies are disassembled. By computing logical inventory that would be available by disassembling assemblies, inventory levels may be reduced, thereby enhancing the efficiency of an inventory control system that includes the logical inventory mechanism. Assemblies in inventory thus may be used in two very different matters, as the starting point for a higher-level assembly, or to be disassembled to use one or more reusable components in the assembly in a different assembly.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 1:
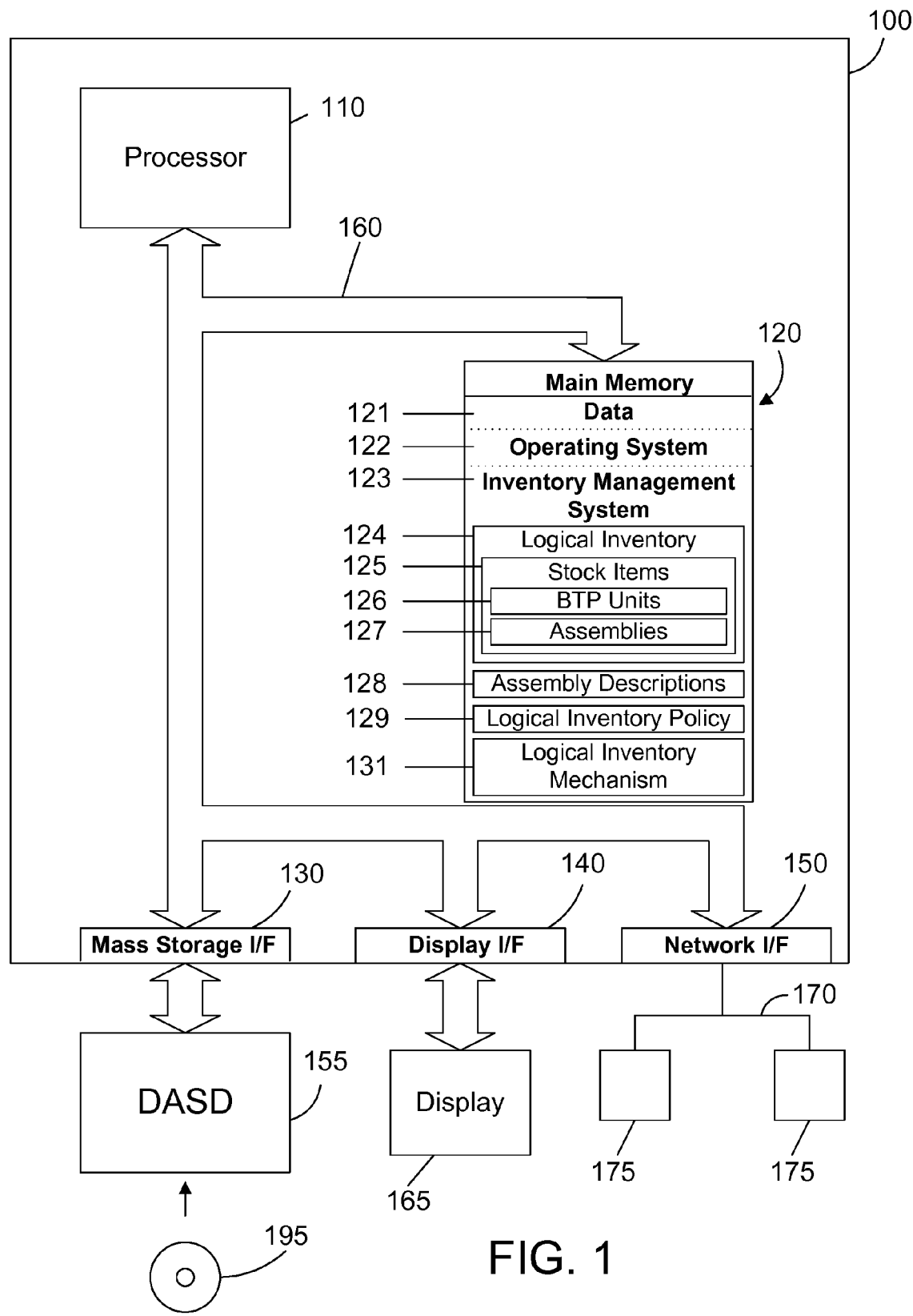
FIG. 1 is a block diagram of an apparatus that includes a logical inventory mechanism that determines when components in assemblies may be reused and adjusts physical inventory with the number or reusable components to generate a logical inventory for the components.
Figures 8, 9, 10:
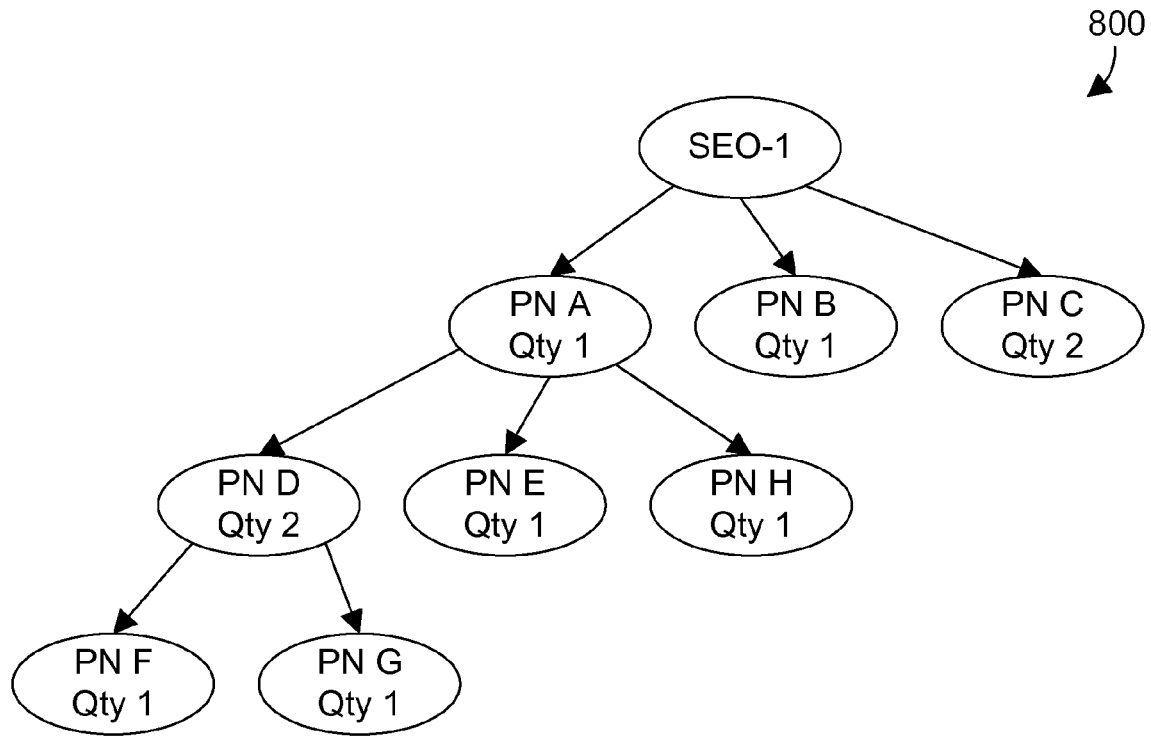
FIG. 8 is a tree diagram that shows the components in an example assembly referred to as stock item SEO-1, which is one possible implementation for the assembly descriptions 128 in FIG. 1.
FIG. 9 is a table showing product demand for the stock item in FIG. 8.
FIG. 10 is a table showing physical inventory of stock items.
Figure 11:
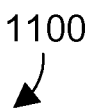
FIG. 11 is a table showing stock item reduction percentage, which is an example of something that may be specified in the logical inventory policy 129 in FIG. 1.
Figure 12:
Figure 13:

FIG. 12 is a table showing stock item reallocation explosion, which is an example of something that may be specified in the logical inventory policy 129 in FIG. 1; and FIG. 13 is a table showing the stock item logical inventory which takes into account inventory of parts that are available by disassembling stock item SEO-1 based on the assembly description in FIG. 8 and the information in the tables of FIGS. 9-12, then adjusting the physical inventory levels in FIG. 10 that would result from disassembly of some of the SEO-1 assemblies in physical inventory.

DETAILED DESCRIPTION

The claims and disclosure herein provide a logical inventory mechanism that has the ability to determine from descriptions of assemblies and logical inventory policies appropriate adjustments to physical inventory to generate logical inventory for one or more components based on potentially disassembling assemblies and reusing some or all of their components. By adjusting physical inventory levels according to components that reside in assemblies, the logical inventory mechanism generates a logical inventory that efficiently takes into account components that have already been assembled into an assembly but which may be disassembled and reused elsewhere. By so doing, the logical inventory mechanism helps reduce inventory levels, thereby enhancing the efficiency of an inventory control system.

Referring to FIG. 1, a computer system 100 is one suitable implementation of a computer system that includes a logical inventory mechanism that takes into account inventory of parts that are already assembled in assemblies when determining purchase requirements. Computer system 100 is an IBM System i solution. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122 and an inventory management system 123. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Inventory management system 123 includes a logical inventory 124, assembly descriptions 128, logical inventory policy 129, and a logical inventory mechanism 131. The logical inventory 124 includes stock items 125 that include Build-to-Plan (BTP) units 126 and assemblies 127. Logical inventory 124 represents physical inventory that has been adjusted according to the stock items available in the assemblies 127 according to the assembly descriptions 128 and logical inventory policy 129. Assembly descriptions 128 provide details regarding which stock items are contained within an assembly. Logical inventory policy 129 provides information that determines which stock items (i.e., components) in an assembly may be reused if the assembly is disassembled. Logical inventory mechanism 131 determines demand, then adjusts physical inventory to produce a logical inventory according to the assembly descriptions 128 and logical inventory policy 129. The logical inventory mechanism 131 adjusts physical inventory to produce the logical inventory 124, which it then used to generate purchase requirements to satisfy a specified demand. The logical inventory mechanism 131 essentially recognizes that some components in an assembly may be reused if the assembly is disassembled, thereby allowing the logical inventory mechanism 131 to reduce the purchase requirements for a part based on available, reusable parts in the assemblies.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and inventory management system 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a logical inventory mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the logical inventory mechanism may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
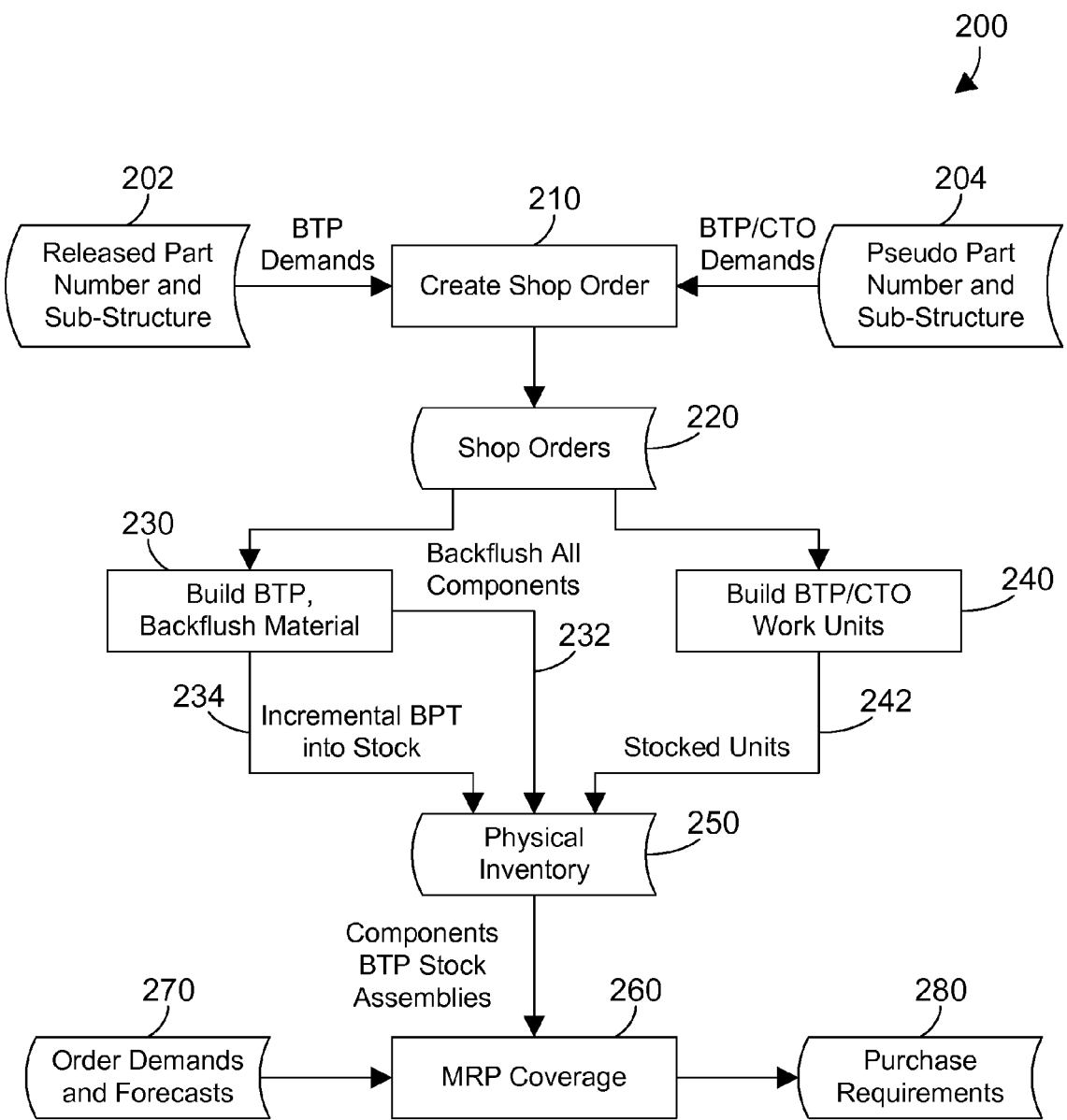
FIG. 2 is a flow diagram of a prior art inventory control system.

Referring to FIG. 2, a flow diagram of a prior art inventory control system 200 begins by creating a shop order (step 210) using data 202 relating to released BTP part numbers and/or data 204 relating to pseudo part numbers that are not released but represent a defined structure of parts, such as a CTO order (e.g., for a System i computer system). The result is one or more shop orders 220. If a shop order 220 is for a BTP item, the BTP item is built (step 230) and all the material (parts) used in the BTP are backflushed into (i.e., removed from) the inventory (step 232) to show these components have been used and are therefore no longer available, and the BTP items are placed into physical inventory (step 234). If a shop order 220 is for BTP/CTO work units, the units are built (step 240) and are placed into physical inventory (step 242). Note that in prior art system 200, once a unit is built in step 230 or step 240, it is placed into physical inventory 250 under its own part number. The backflushing of components in step 232 removes these components from inventory 250 because they are now part of a larger assembly that has a different part number. As a result, the assemblies in the inventory 250 essentially mask the components that are in them, because the prior art system 200 assumes the assemblies may be used once they are built and does not provide for disassembly of assemblies to recover reusable components. As a result, the inventory 250 may include components, BTP stock, and assemblies. In the most preferred implementation, each assembly has its own part number in the inventory, thereby masking the components in the assembly from the inventory control system.

Prior art system 200 includes a Materials Resource Planning (MRP) coverage step 260 that determines order demands and forecasts 270, that compares order demands and forecasts 270 to existing physical inventory 250, and generates from these two purchase requirements 280. For example, if there are ten assemblies in inventory 250, and if the order demands and forecasts 270 indicate twenty of these assemblies are needed, the MRP coverage 260 will generate purchase requirements 280 for all of the components to build an additional ten assemblies.

A feature of prior art method 200 is the effective hiding of components in assemblies by providing assemblies their own part numbers. When components are used in an assembly, the components are removed from inventory, and the assembly is added to inventory. This is consistent with most known inventory control systems, where there may be multiple layers of hierarchy, and each layer is given a new part number that encapsulates all of the components at the lower layer. While this greatly simplifies inventory control, it also has disadvantages as well.

For some items, such as BTP items, the components may not be effectively reused. For example, the integrated circuits, resistors and capacitors on a memory card cannot be reused because they are typically soldered to a printed circuit board, and the process of removing these components from a memory card would either be destructive to the components, or would put sufficient stress on the components to reduce their life. As a result, many components cannot be reused. However, some components at some levels may be easily reused. For example, let's assume (as discussed in the Background section) that an assembly is defined for a System i platform that includes a chassis, a motherboard, a processor, a power supply, and a memory card. Let's further assume the memory card plugs into a slot in the motherboard, as is known in the art. In this case, the memory card could very easily be removed from the assembly and reused in a different assembly. But once a memory card is placed in an assembly, the memory card is taken out of inventory and the part number for the assembly is added to inventory, effectively masking the presence of a reusable component to the inventory control system.

A simple example will illustrate. Let's assume the assembly discussed above with a chassis, a motherboard, a processor, a power supply, and a memory card has a part number ABC-1. Let's further assume that based on projected demand, fifty ABC-1 assemblies are built and put into inventory. Now let's assume that thirty DEF-1 assemblies need to be built that each include a memory card, but there are only ten memory cards in inventory. The prior art inventory control system 200 in FIG. 2 will recognize a shortfall of twenty memory cards (30 demand minus 10 in stock), and will generate an order for twenty memory cards to fulfill the need for the thirty DEF-1 assemblies that each include a memory card. Note, however, that there are fifty memory cards sitting in the fifty ABC-1 assemblies, but these memory cards are masked by the ABC-1 part number in inventory. The logical inventory mechanism discussed and claimed herein recognizes that the fifty ABC-1 assemblies contain one memory card each, allowing an inventory control system to recognize as inventory twenty of the memory cards in twenty of the ABC-1 assemblies to meet the need for thirty DEF-1 assemblies. This prevents ordering more memory cards when there are a sufficient number on-hand in assemblies to satisfy the demand.

Figure 3:
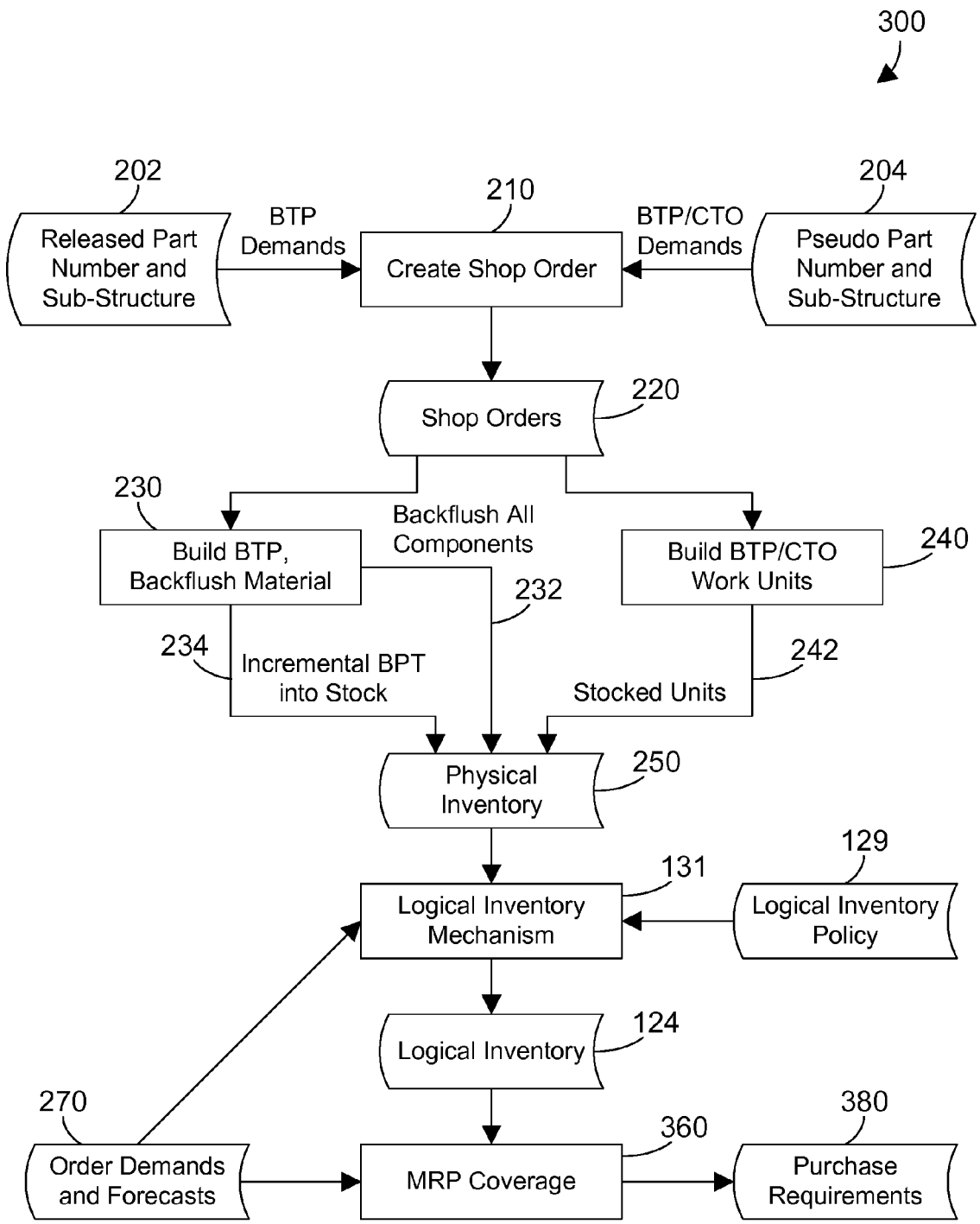
FIG. 3 is a flow diagram of an inventory control system that includes a logical inventory mechanism that determines logical inventory based on adjusting physical inventory by the reusable components in assemblies, and uses the logical inventory in determining purchase requirements.

Referring to FIG. 3, a method 300 in accordance with the disclosure and claims herein includes many items that are also in prior art method 200 shown in FIG. 2. For example, items 202, 204, 210, 220, 230, 232, 234, 240, 242, 250 and 270 in FIG. 3 are preferably the same as the similarly-numbered items in FIG. 2, which are described in detail above. Method 300 additionally includes a logical inventory mechanism 131 that functions according to a logical inventory policy 129 to generate from the physical inventory 250 a logical inventory 124. The MRP coverage (step 360) compares the order demands and forecasts 270 to the logical inventory 124, not the physical inventory 250, in generating purchase requirements 380.

The logical inventory mechanism 131 in FIG. 3 is also shown in FIG. 1 and is discussed in detail above with respect to FIG. 1. As explained above, the logical inventory mechanism 131 determines which components in assemblies in inventory may be reused according to the logical inventory policy 129. Some components may be reused, while others may not. For example, a memory card could be easily reused by removing it from the slot on the motherboard and placing the memory card in a different assembly. However, other items such as connectors may not be reliable enough to be reused. As a result, the logical inventory policy 129 preferably indicates which components in an assembly may be reused, and at what level. Let's now revisit the example given above, where fifty ABC-1 assemblies are in inventory, ten memory cards are in inventory, and it is determined that thirty memory cards are needed (as part of the order demands and forecasts 270 in FIG. 3). The logical inventory mechanism 131 recognizes from the logical inventory policy 129 that the memory cards in some or all of the fifty ABC-1 assemblies may be reused, and determines the thirty memory cards may be provided using the ten memory cards in inventory, and disassembling twenty of the ABC-1 assemblies to reuse the memory cards in these assemblies. As a result, the purchase requirements 380 for memory cards may be zero.

Figure 4:
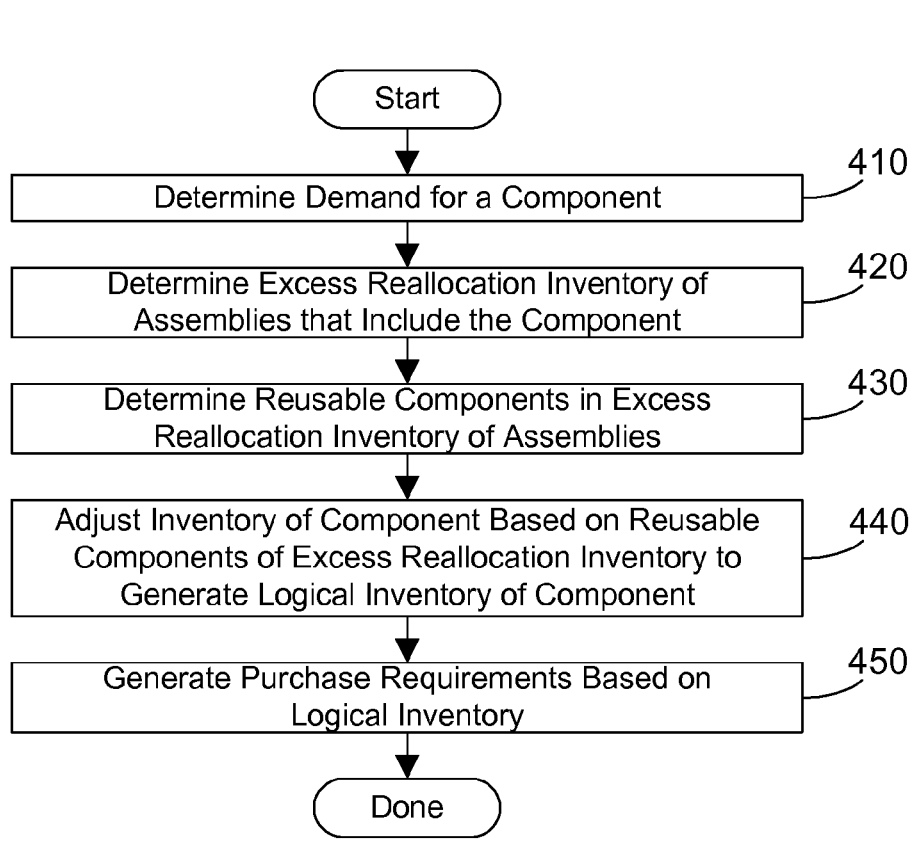
FIG. 4 is a flow diagram of a method for the logical inventory mechanism 131 in FIG. 1 to adjust physical inventory and generate therefrom logical inventory, which comprises reusable components in assemblies, which is used in determining purchase requirements.

A method 400 in FIG. 4 is preferably performed by the logical inventory mechanism 131 in FIGS. 1 and 3. First, demand is determined for a component (step 410). Then, excess reallocation inventory of assemblies that include the component is determined (step 420). Excess reallocation inventory is the inventory that is available for disassembly. The reusable components in the excess reallocation inventory of assemblies is then determined (step 430). The physical inventory of the component is then adjusted based on the reusable components in the excess reallocation inventory to generate a logical inventory of the component (step 440). Purchase requirements are then generated based on the logical inventory of the component (step 450). Method 400 recognizes that assemblies in inventory may include reusable components that may be used to satisfy new orders, and therefore generates a logical inventory that includes some or all of the reusable components in the assemblies in inventory. The result is a more efficient use of inventory.

Figure 5:
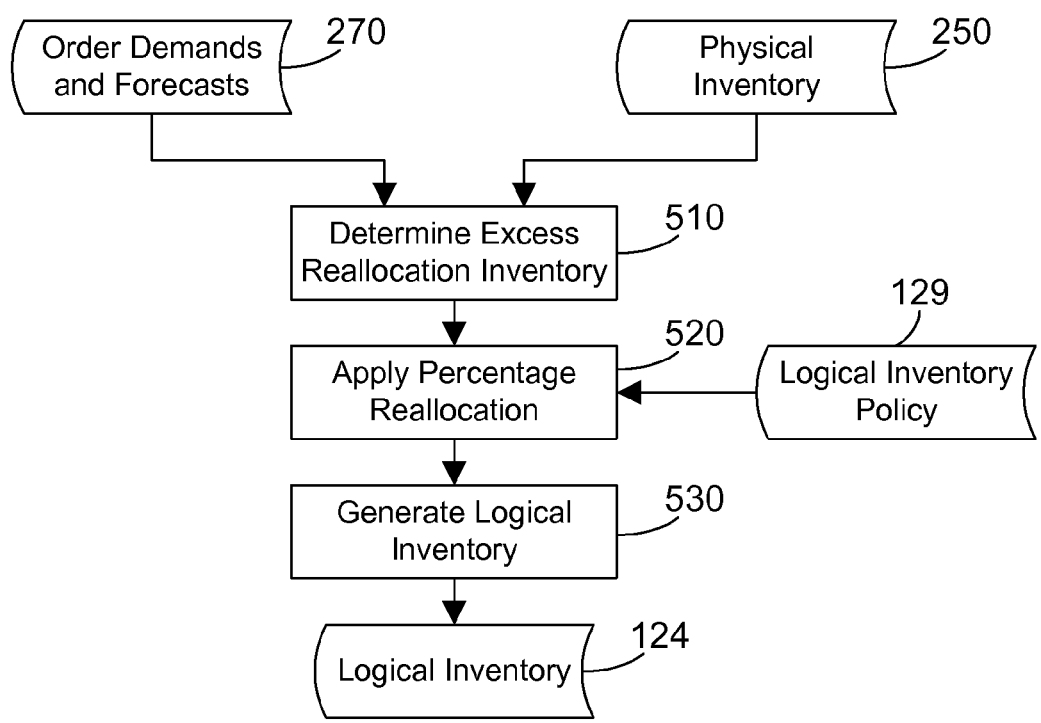
FIG. 5 is a flow diagram showing one specific system that could implement method 400 in FIG. 4.

Referring to FIG. 5, a system 500 is one suitable implementation of a system that may execute method 400 in FIG. 4. First, system 500 determines excess reallocation inventory of assemblies (step 510). Next, a percentage reallocation is determined from the logical inventory policy 129, and is applied to the excess inventory (step 520). Finally, the logical inventory 124 is generated from the physical inventory 250 adjusted by the reusable components in assemblies in inventory (step 530).

Figure 6:
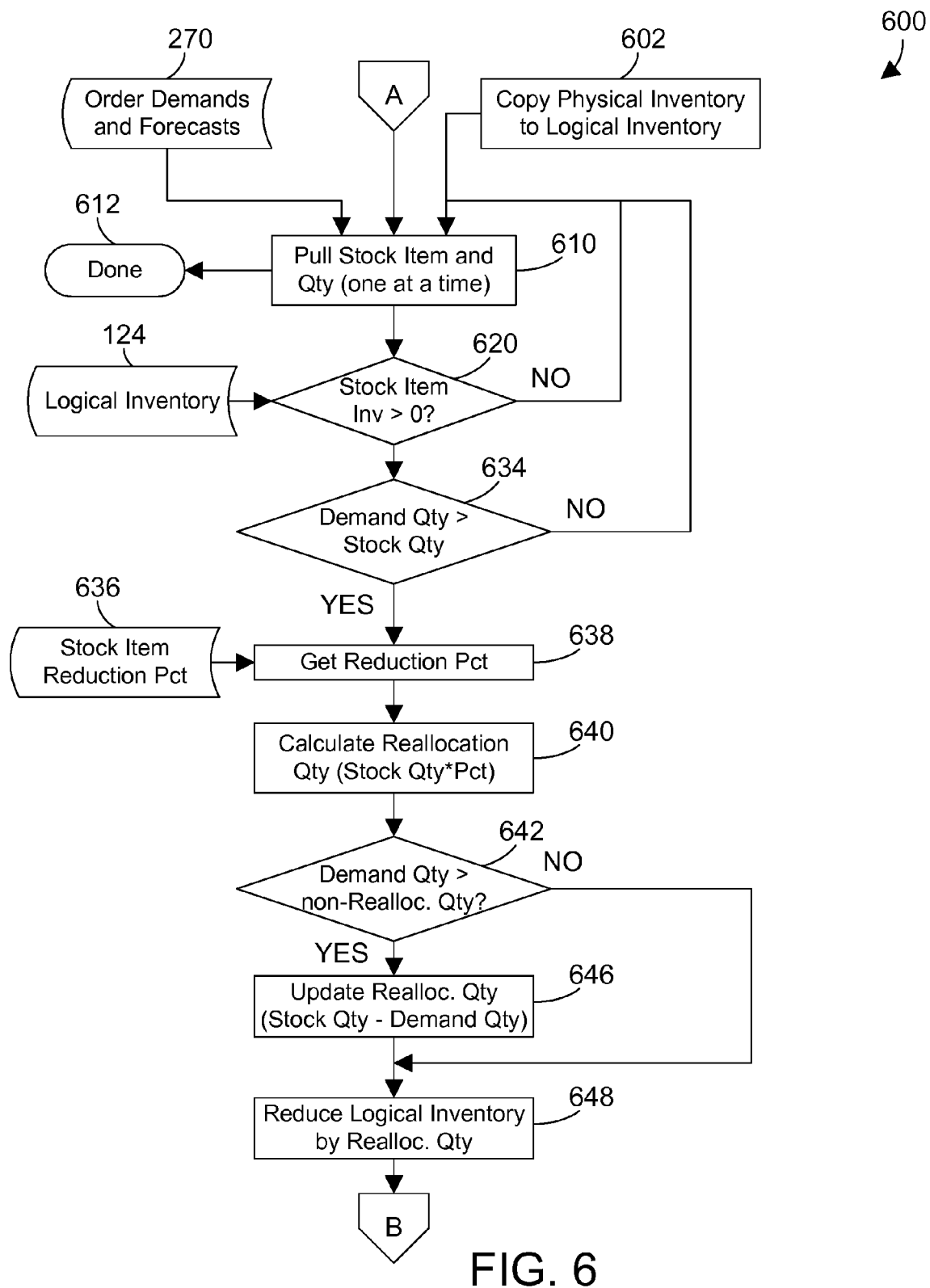
FIGS. 6 and 7 are two different portions of a flow diagram showing one specific implementation for the inventory control mechanism 131 in FIG. 1.
Figure 7:
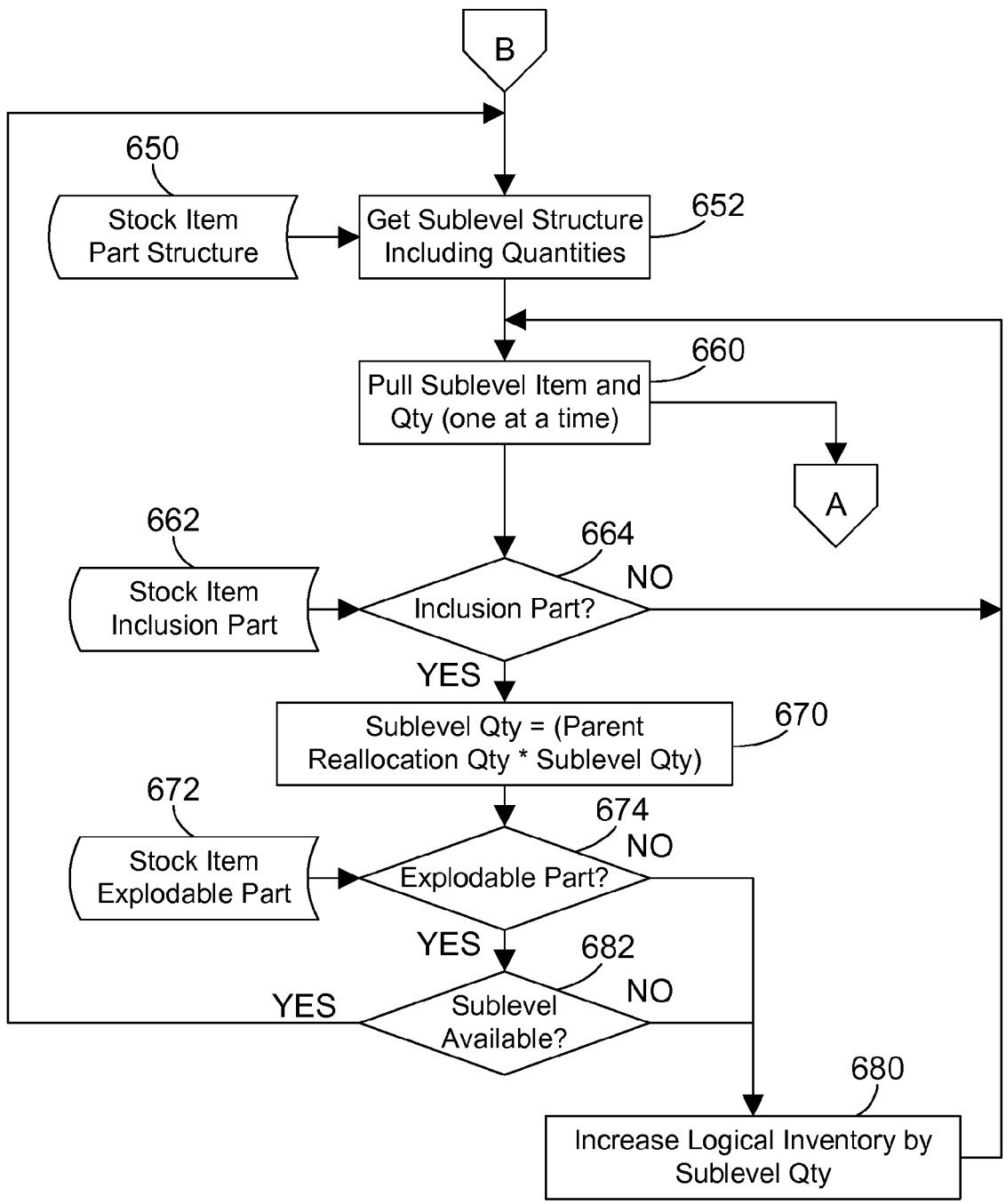

FIGS. 6 and 7 show a detailed method 600 that represents one suitable implementation of method 400 in FIG. 4. First, the physical inventory is copied to the logical inventory (step 602). Next, stock items are pulled one at a time from the order demands and forecasts 270 (step 610). A "stock item" as used in method 600 represents a component that has a separate part number in inventory, whether it be a released part number (e.g., 202 in FIG. 3) or a pseudo part number (e.g., 204 in FIG. 3). The demand and quantity of a stock item are pulled in step 610 from the order demands and forecasts 270, but from that point on in FIGS. 6 and 7 the item is referred to as a stock item. Once all stock items have been pulled and processed from the order demands and forecasts 270, method 600 is done (step 612). For each selected stock item, the logical inventory 614 for the stock item is read. If the stock item inventory 614 is zero (step 620=NO), the next stock item is pulled from the order demands and forecasts 270 (step 610). If the logical inventory 124 for the stock item is non-zero (step 620=YES), the demand quantity for the stock item is compared to the logical inventory 124 of the stock item (step 634). If the demand is not greater than the existing stock item inventory 614 (step 634=NO), this means existing inventory can meet demand, so no determination of logical inventory is necessary for the selected stock item.

If the demand is greater than the stock quantity for the selected stock item (step 634=YES), the stock item reduction percentage 636 is read (step 638). The stock item reduction percentage 636 is preferably specified in the logical inventory policy 129 in FIGS. 1 and 3. The reallocation quantity is then calculated by multiplying the stock quantity by the stock item reduction percentage 636 (step 640). If the demand quantity can be satisfied by the non-reallocated quantity (step 642=NO), the logical inventory is reduced by the reallocation quantity of the stock item (step 648). If the demand quantity cannot be satisfied by the non-reallocated quantity (step 642=YES), the reallocation quantity is updated by subtracting the demand quantity from the stock quantity (step 646), and the logical inventory is reduced by the reallocation quantity of the stock item (step 648).

We now proceed to entry point B in FIG. 7. The stock item part structure 650 is read to get the sublevel structure of the stock unit including quantities (step 652). The stock item part structure 650 is preferably included in the assembly descriptions 128 shown in FIG. 1. At this point, each sublevel item is pulled one at a time (step 660). When all sublevel items have been processed, control passes to exit point A in FIG. 7 to entry point A in FIG. 6. For each selected sublevel item, the stock item inclusion part data 662 is read to determine whether the part is an inclusion part (step 664). Stock item inclusion part data 662 is preferably included in the logical inventory policy 129 in FIG. 1. If the part is not an inclusion part (step 664=NO), control passes to step 660, where the next sublevel item is pulled and the method continues. If the part is an inclusion part (step 664=YES), the sublevel quantity is computed as the parent reallocation multiplied by the sublevel quantity (step 670).

The stock item explodable part data 672 is then read to determine whether the stock item is an explodable part. The stock item explodable part data 672 is preferably included in the logical inventory policy 129 in FIG. 1. If the part is not explodable (step 674=NO), the logical inventory is increased by the sublevel quantity (step 680). If the part is explodable (step 674=YES) and the sublevel is available (step 682=YES), control passes to step 652 and method 600 continues. If the sublevel is not available (step 682=NO), the logical inventory is increased by the sublevel quantity (step 680). The steps in FIG. 7 continue until all sublevel items have been pulled one at a time and there are no more sublevel items to pull, at which point control passes to exit point A, which takes method 600 to entry point A in FIG. 6.

A simple example is now provided to illustrate the concepts shown in FIGS. 4-7 and discussed above. Referring to FIG. 8, a tree structure 800 is shown that graphically illustrates the components in an assembly that has a stock number SEO-1. This tree structure 800 is one suitable form for assembly descriptions 128 in FIG. 1. The tree structure 800 in FIG. 8 shows that the assembly SEO-1 includes one part number A, one part number B, and two part number C. Each part number A includes two part number D, one part number E and one part number H. Each part number D includes one part number F and one part number G.

We now assume the product demand for the SEO-1 assembly is 500, as shown in the table in FIG. 9. This product demand of 500 is part of or derived from the order demands and forecasts 270 shown in FIGS. 2, 3, 5 and 6. The stock item physical inventory for the assembly SEO-1 and its components is shown in table 1000 in FIG. 10. As shown in table 1000, the current physical inventory shows 1000 SEO-1 assemblies, and 10 of each of part numbers A through H.

FIG. 11 shows a sample table 1100 that indicates a reduction percentage for the SEO-1 assembly. FIG. 12 shows a sample table 1200 that indicates a stock item reallocation explosion, and whether or not the individual parts should be included or not. Tables 1100 and 1200 include information that could be included in the logical inventory policy 129.

We now go through this example in FIGS. 8-12 in detail to determine how to generate the logical inventory shown in table 1300 in FIG. 13. The logical inventory mechanism 131 determines that the physical inventory for the SEO-1 stock item is 1,000 (see FIG. 10), while the demand is 500 (see FIG. 9). The first step is to apply the stock item reduction percentage for SEO-1 as shown in FIG. 11. The reduction percentage contains a default in the first row in table 1100 in FIG. 11 for all parts that specifies zero reduction percentage. The second row in table 1100 shows a reduction percentage of 20, which means twenty percent of the physical inventory may be considered for disassembly to recover reusable parts, if needed. Thus, we first reduce the quantity of the stock item SEO-1 in the logical inventory by twenty percent, making the logical inventory for SEO-1 a quantity of 800. In effect, two hundred SEO-1 units have been identified for potential disassembly to recover reusable parts. Now we look at each part number to determine how the physical inventory should be adjusted to produce the logical inventory shown in FIG. 13.

We see from the stock item reallocation explosion table 1200 in FIG. 12 whether a part number is an explosion of other parts, and whether the part number should be included in the adjustment to generate logical inventory. In essence, a component has a "Y" in the "Inclusion" column if the component may be reused by removing it from the SEO-1 assembly and placing the component in a different assembly. We first consider PN A. According to the tree 800 in FIG. 8, there is one PN A in each SEO-1 assembly. The third row in the stock item reallocation explosion table 1200 in FIG. 12 shows stock item SEO-1 and PN A, and shows a Y in the Explosion column indicating part number A is an explosion of its component parts, and a Y in the Inclusion column indicating that PN A may be reused. Because PN A is an explosion of other parts, the inventory for part number A is not adjusted, but remains at 10 in the logical inventory, as shown in table 1300 in FIG. 13.

We now consider PN D. We see from tree 800 in FIG. 8 that there are two PN D for each SEO-1. The last row in table 1200 in FIG. 12 shows PN D is not an explosion, and is included. As a result, the quantity of PN D is adjusted by adding 400 (two PN Ds in each SEO-1 that may be disassembled) to the 10 in physical inventory, resulting in 410 PN D in logical inventory, as shown in table 1300 in FIG. 13. Next we consider PN E. There is one PN E in each SEO-1 assembly, as shown in tree 800 in FIG. 8. The fourth row in table 1200 in FIG. 12 indicates PN E is not an explosion and is included. As a result, the quantity of PN E is adjusted by adding 200 to the 10 in physical inventory, resulting in 210 PN E in logical inventory, as shown in table 1300 in FIG. 13.

PN F and PN G need not be considered, because they are part of PN D, and PN D does not require explosion according to last row in table 1200 in FIG. 12. As a result, the quantity in physical inventory of 10 for PN F and 10 for PN G are not adjusted in arriving at the logical inventory for these parts. Finally we consider PN H. We see from the tree 800 in FIG. 8 there is one PN H in each SEO-1 assembly. The fifth row in table 1200 in FIG. 12 indicates that PN H is not an explosion, and that PN H is not included. This means that PN H cannot be reused after it is removed from the SEO-1 assembly. Because PN H cannot be reused, the availability of 200 SEO-1 units for disassembly does not affect the quantity of available PN H, so the physical inventory of 10 for PN H is not adjusted in arriving at the logical inventory for PN H shown in table 1300 in FIG. 13.

Next we consider PN B. There is one PN B in each SEO-1 assembly, as shown in tree 800 in FIG. 8. Referring to table 1200 in FIG. 12, the second row shows PN B is not an explosion and is included. This means the quantity of PN B in the logical inventory is adjusted to account for the quantity of PN B that are in the 200 SEO-1 units that may be disassembled. There is one PN B in each of the 200 SEO-1 units that may be disassembled, so the quantity of PN B is adjusted by adding 200 to the 10 in physical inventory, resulting in 210 PN B in logical inventory, as shown in table 1300 in FIG. 13. In similar fashion, the tree 800 in FIG. 8 shows there are two PN C in each of the 200 SEO-1 units that may be disassembled. There is no explicit entry in table 1200 in FIG. 12 that lists PN C, so the first default entry ALL is used, which indicates PN C is included. As a result, the quantity of PN C is adjusted by adding 400 to the 10 in physical inventory, resulting in 410 PN C in logical inventory, as shown in table 1300 in FIG. 13.

The example in FIGS. 8-13 shows how the logical inventory mechanism may be used to essentially earmark a percentage of excess inventory for disassembly, with their components being flowed back into the quantity of available inventory by adjusting the physical inventory amount, which generates a logical inventory for the components. This allows an inventory control system to more efficiently use inventory that may be available in assemblies that may be easily reused.

The specification includes many different terms that represent items in inventory, including parts, BTP units, CTO units, stock units, components and assemblies. In the claims that follow, the term "component" is used to broadly encompass any item in inventory that may be a portion of a larger assembly, and the term "assembly" is used to broadly encompass any item in inventory that includes one or more components. In the most preferred implementation, an assembly is distinguished by having its own part number.

The simple examples provided above show how logical inventory for a component may be generated by considering disassembly of assemblies in inventory that contain the component. While the examples shown herein generate logical inventory based on a single type of assembly that includes the component, the disclosure and claims herein also extend to generating logical inventory based on multiple different assembly types that each contain the component. In this manner, logical inventory may be generated by accounting for inventory in different types of assemblies.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer-implemented method for determining purchase requirements for a component in an inventory control system, the method comprising the steps of:
   (A) providing at least one processor;
   (B) providing computer readable memory in communication with the at least one processor;
   (C) storing order demands and forecasts in the memory;
   (D) storing physical inventory in the memory;

(E) determining demand for the component from the order demands and forecasts stored in step (C) and from the physical inventory stored in step (D);
(F) copying the physical inventory for the component to a logical inventory for the component;
(G) reading a description for an assembly that specifies the component of the assembly;
(H) reading a logical inventory policy that specifies:
 (H1) whether the component in the assembly may be reused or not if the assembly is disassembled;
 (H2) whether the component in the assembly is an explodable part, wherein an explodable part is an assembly of other components; and
 (H3) a reduction percentage less than 100% that specifies a percentage of the assembly in the physical inventory that may be potentially disassembled;
(I) determining from the reduction percentage a number of the at least one assembly that may be potentially disassembled;
(J) determining from the physical inventory stored in step (D) excess inventory of the assembly that includes the component;
(K) determining from the physical inventory stored in step (D) and the information in (H1) and (H3) in the logical inventory policy a number of the component in the excess inventory that may be reused;
(L) determining from (H2) in the logical inventory policy whether the component is an explodable part;
(M) when the component is an explodable part, repeating steps (I), (J), (K) and (L) for each sublevel in the explodable part specified in the description of the assembly read in step (G);
(N) when the component is not an explodable part and (H1) in the logical inventory policy indicates the component may be reused, increasing the logical inventory of the component by the number of the component determined in step (K) for each level of the part, wherein the logical inventory for the component is greater than the physical inventory of the component due to potential reuse of the component if assemblies in the excess inventory are disassembled; and
(O) determining the purchase requirements for the component based on the demand for the component and the logical inventory for the component.

2. An apparatus comprising:
at least one processor;
a memory coupled to the at least one processor; and
a logical inventory mechanism residing in the memory and executed by the at least one processor, the logical inventory mechanism storing order demands and forecasts, storing physical inventory in the memory, determining demand for a component from the stored order demands and forecasts and from the stored physical inventory, copying the physical inventory for the component to a logical inventory for the component, reading a description for an assembly that specifies the component of the assembly, reading a logical inventory policy that specifies whether the component in the assembly may be reused or not if the assembly is disassembled, whether the component in the assembly is an explodable part, wherein an explodable part is an assembly of other components, and a reduction percentage less than 100% that specifies a percentage of the assembly in the physical inventory that may be potentially disassembled, determining from the reduction percentage a number of the at least one assembly that may be potentially disassembled, determining from the stored physical inventory excess inventory of the assembly that includes the component, determining from the stored physical inventory and the information in the logical inventory policy a number of the component in the excess inventory that may be reused, determining from the logical inventory policy whether the component is an explodable part, and when the component is an explodable part, performing the steps above for each sublevel in the explodable part specified in the description of the assembly, and when the component is not an explodable part and the logical inventory policy indicates the component may be reused, increasing the logical inventory of the component by the number of the component for each level of the part, wherein the logical inventory for the component is greater than the physical inventory of the component due to potential reuse of the component if assemblies in the excess inventory are disassembled, wherein the logical inventory mechanism determines purchase requirements for the component according to the demand for the component and the logical inventory for the component.

3. An article of manufacture comprising:
logical inventory mechanism storing order demands and forecasts, storing physical inventory in the memory, determining demand for a component from the stored order demands and forecasts and from the stored physical inventory, copying the physical inventory for the component to a logical inventory for the component, reading a description for an assembly that specifies the component of the assembly, reading a logical inventory policy that specifies whether the component in the assembly may be reused or not if the assembly is disassembled, whether the component in the assembly is an explodable part, wherein an explodable part is an assembly of other components, and a reduction percentage less than 100% that specifies a percentage of the assembly in the physical inventory that may be potentially disassembled, determining from the reduction percentage a number of the at least one assembly that may be potentially disassembled, determining from the stored physical inventory excess inventory of the assembly that includes the component, determining from the stored physical inventory and the information in the logical inventory policy a number of the component in the excess inventory that may be reused, determining from the logical inventory policy whether the component is an explodable part, and when the component is an explodable part, performing the steps above for each sublevel in the explodable part specified in the description of the assembly, and when the component is not an explodable part and the logical inventory policy indicates the component may be reused, increasing the logical inventory of the component by the number of the component for each level of the part, wherein the logical inventory for the component is greater than the physical inventory of the component due to potential reuse of the component if assemblies in the excess inventory are disassembled, wherein the logical inventory mechanism determines purchase requirements for the component according to the demand for the component and the logical inventory for the component; and
recordable media bearing the logical inventory mechanism.

* * * * *